United States Patent [19]

Gingerich et al.

[11] Patent Number: 4,826,622

[45] Date of Patent: May 2, 1989

[54] METHOD OF MAKING ALKALINE EARTH HALOPHOSPHATE PHOSPHOR

[75] Inventors: Richard G. W. Gingerich; John A. Arbie, both of Towanda; Douglas M. Jackson, Wysox, all of Pa.

[73] Assignee: GTE Products Corporation, Stamford, Conn.

[21] Appl. No.: 791,637

[22] Filed: Oct. 25, 1985

Related U.S. Application Data

[63] Continuation of Ser. No. 556,764, Dec. 1, 1983, abandoned.

[51] Int. Cl.$^4$ .............................................. C09K 11/73
[52] U.S. Cl. ...................... 252/301.6 P; 252/301.4 P; 252/301.4 H
[58] Field of Search ................ 252/301.4 P, 301.4 H, 252/301.6 P; 241/15, 16, 21, 29

[56] References Cited

U.S. PATENT DOCUMENTS

| | | | |
|---|---|---|---|
| 2,976,249 | 3/1961 | Rimbach et al. | 252/301.4 P |
| 3,974,305 | 8/1976 | Broekhoven | 252/301.4 P X |
| 3,982,699 | 9/1976 | Jager | 241/29 X |

FOREIGN PATENT DOCUMENTS 251738  2/1961  Australia ...................... 252/301.4 P

*Primary Examiner*—Jack Cooper
*Attorney, Agent, or Firm*—James Theodosopoulos

[57] ABSTRACT

In the manufacture of an alkaline earth halophosphate phosphor, the phosphor ingredients are mixed, fired, wet milled and dried. By sieving the material part way through the wet milling process and by sifting the dry phosphor powder, the phosphor powder weight in fluorescent lamps can be reduced.

2 Claims, No Drawings

METHOD OF MAKING ALKALINE EARTH HALOPHOSPHATE PHOSPHOR

This application is a continuation of application Ser. No. 556,764, filed 12/01/83, now abandoned.

This invention is concerned with the manufacture of alkaline earth halophosphate phosphors which are used in fluorescent lamps. It is particularly concerned with such manufacture where calcium monohydrogen phosphate is one of the raw ingredients used. Such $CaHPO_4$ use is disclosed in, for example, the following U.S. Pats. Nos.: 3,925,239; 3,919,109; 3,864,274; 3,798,479; 3,655,576; 3,579,463; 3,538,014; 3,538,013; 3,485,767; 3,470,106; 3,468,811; 3,379,649; 3,099,627; 3,002,933; 2,465,786; and 2,592,261.

A prior art process for making the phosphor involved selecting $CaHPO_4$ of suitable particle size and mixing it with other ingredients, firing the mixture at an elevated temperature to react the ingredients to form a phosphor cake and then roll crushing the cake to yield relatively coarse material, wet milling the coarse material for a short time to yield a fine powder that will pass through a 270 mesh screen, filtering and then drying the powder to yield the desired powdered phosphor.

We have found that a modification of the prior art process will result in a phosphor that can be used in a fluorescent lamp at a lower powder weight. The modification is in the wet milling step; it also includes the step of sifting the dry phosphor powder. In our invention, the phosphor is sieved part way through the wet milling process to remove the material that will pass through a screen finer than 270 mesh, and returning the remaining coarser material to the mill for further wet milling until it all passes through the screen. Additionally, the dry phosphor powder is screened through an even finer screen, say, 378 mesh.

In one example the following materials were mixed and blended in the following mole ratios.

$CaHPO_4$: 3.1
$CaCO_3$: 1.3
$CaF_2$: 0.4
$NH_4Cl$: 0.3
$MnCO_3$: 0.2
$Sb_2O_3$: 0.2
$CdO$: 0.2

The well blended mixture was fired at about 1100° C. and then roll crushed to about 20 mesh. About 1450 kilograms of the crushed material was slurried in about 260 gallons of hot deionized water and then milled for 1 to 2 hours, after which it was pumped to a separator containing a 332 mesh nylon screen. About half the material was fine enough to pass through the screen and was transferred to a treatment tank. The remaining coarser material was returned to the mill, and mille further until it all passed through the 332 mesh screen. After acid treatment in the tank, the material was drum filtered, washed and again screened through 332 mesh nylon. After treatment with ammonium hydroxide, the material was filtered, dried and then passed through a 378 mesh screen. 98% of the phosphor powder passed through the screen.

A comparison in fluorescent lamps was made of this phosphor versus the prior art phosphor. This phosphor yielded the same lamp brightness with about 10% less powder weight, 6.6 grams per lamp versus 7.3 grams.

We claim:

1. In the manufacture of an alkaline earth halophosphate phosphor for use in fluroescent lamps, the steps which comprise: mixing $CaHPO_4$ of predetermined particle size with $CaCO_3$, $CaF_2$, $NH_4CL$, $MnCO_3$, $Sb_2O_3$ and $CdO$; firing the mixture at an elevated temperature to react the ingredients to form a phosphor cake; crushing the phosphor cake to yield relatively coarse material; slurrying the material with water and then first wet milling the slurried material; sieving the wet milled material part way through the wet milling process through a screen finer tha 270 mesh; collecting the fine material that passes through the screen and returning to the mill the material too coarse to pass through the screen for second wet milling until it all passes through the screen; filtering and drying the material to yield phosphor powder; and sifting the dry phosphor powder through a screen finer than the screen used in screening the wet milled material.

2. In the manufacture of an alkaline earth halophosphate phosphor for use in fluorescent lamps, the steps which comprise: mixing $CaHPO_4$ of predetermined particle size with other ingredients that will react with the $CaHPO_4$ to produce the alkaline earth halophosphate housing; firing the mixture at an elevated temperature to react the ingredients to form a phosphor cake; crushing the phosphor cake to yield relatively coarse material; slurrying the material with water and then first wet milling the slurried material; sieving the wet milled material part way through the wet milling process through a screen finer than 270 mesh; collecting the fine material that passes through the screen and returning to the mill the material too coarse to pass through the screen for second set milling until it all passes through the screen; filtering and drying the material to yield phosphor powder; and sifting the dry phosphor powder through a screen finer than the screen used in screening the wet milled material.

* * * * *